Figure 1:
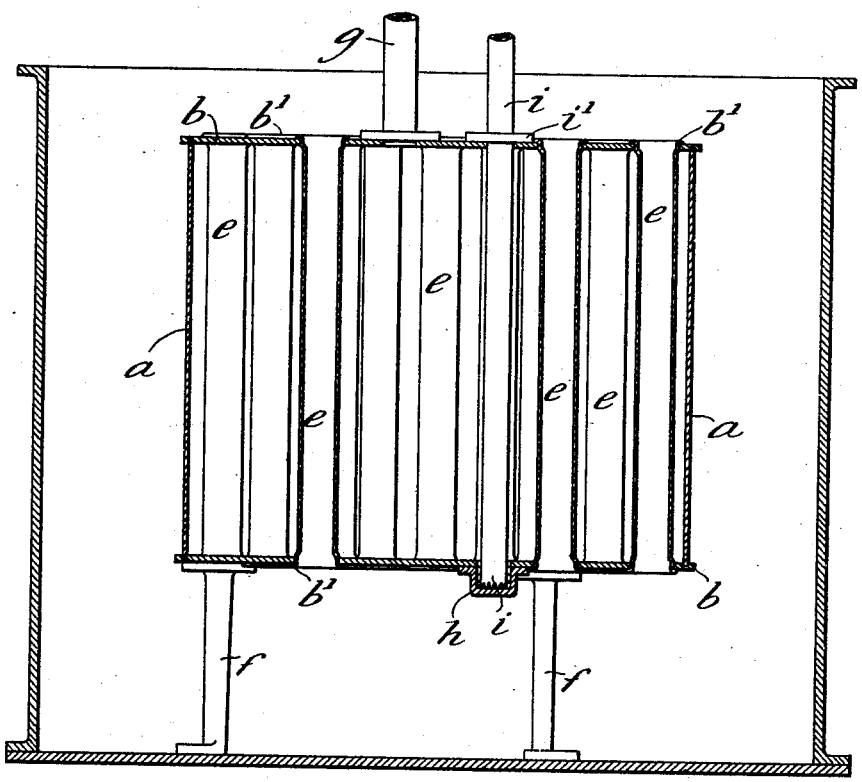

No. 857,779. PATENTED JUNE 25, 1907.
H. J. WORSSAM.
APPARATUS FOR HEATING OR BOILING BREWERS' WORT OR THE LIKE.
APPLICATION FILED MAY 29, 1905.

4 SHEETS—SHEET 1.

WITNESSES
W. W. Swartz
R. A. Balderson

INVENTOR
H. J. Worssam,
by Bakewell & Byrnes,
his Attys

No. 857,779. PATENTED JUNE 25, 1907.
H. J. WORSSAM.
APPARATUS FOR HEATING OR BOILING BREWERS' WORT OR THE LIKE.
APPLICATION FILED MAY 29, 1905.
4 SHEETS—SHEET 2.
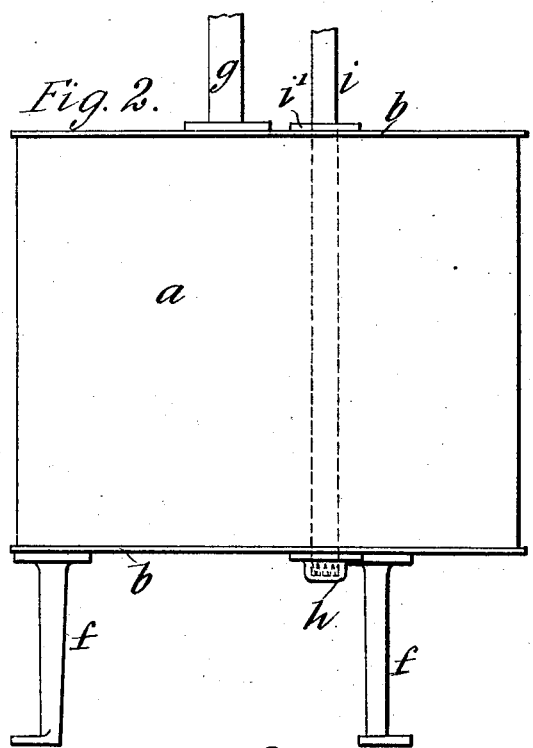
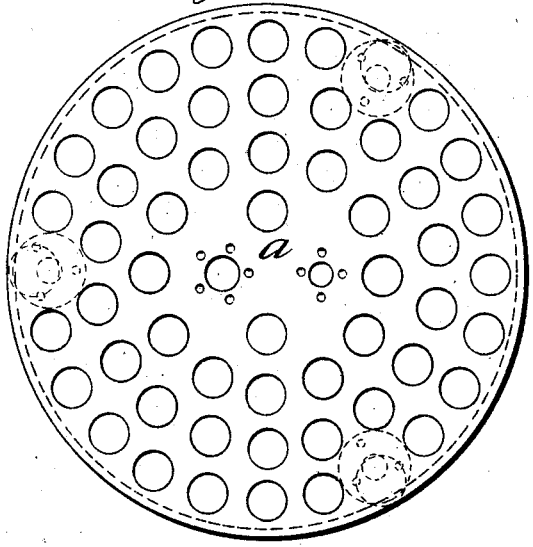
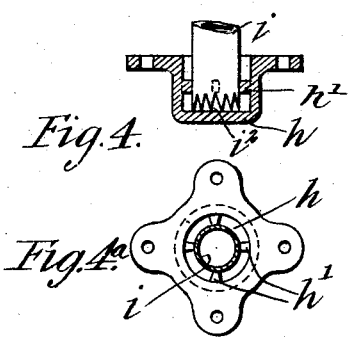
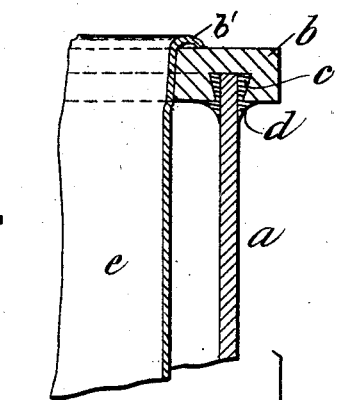
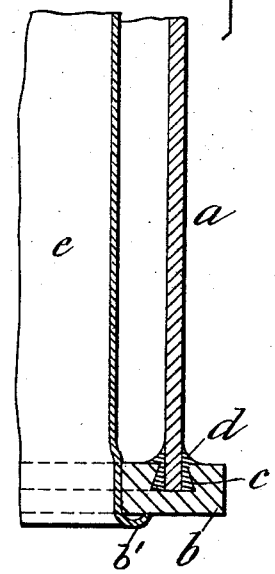
WITNESSES
INVENTOR
THE NORRIS PETERS CO., WASHINGTON, D. C.

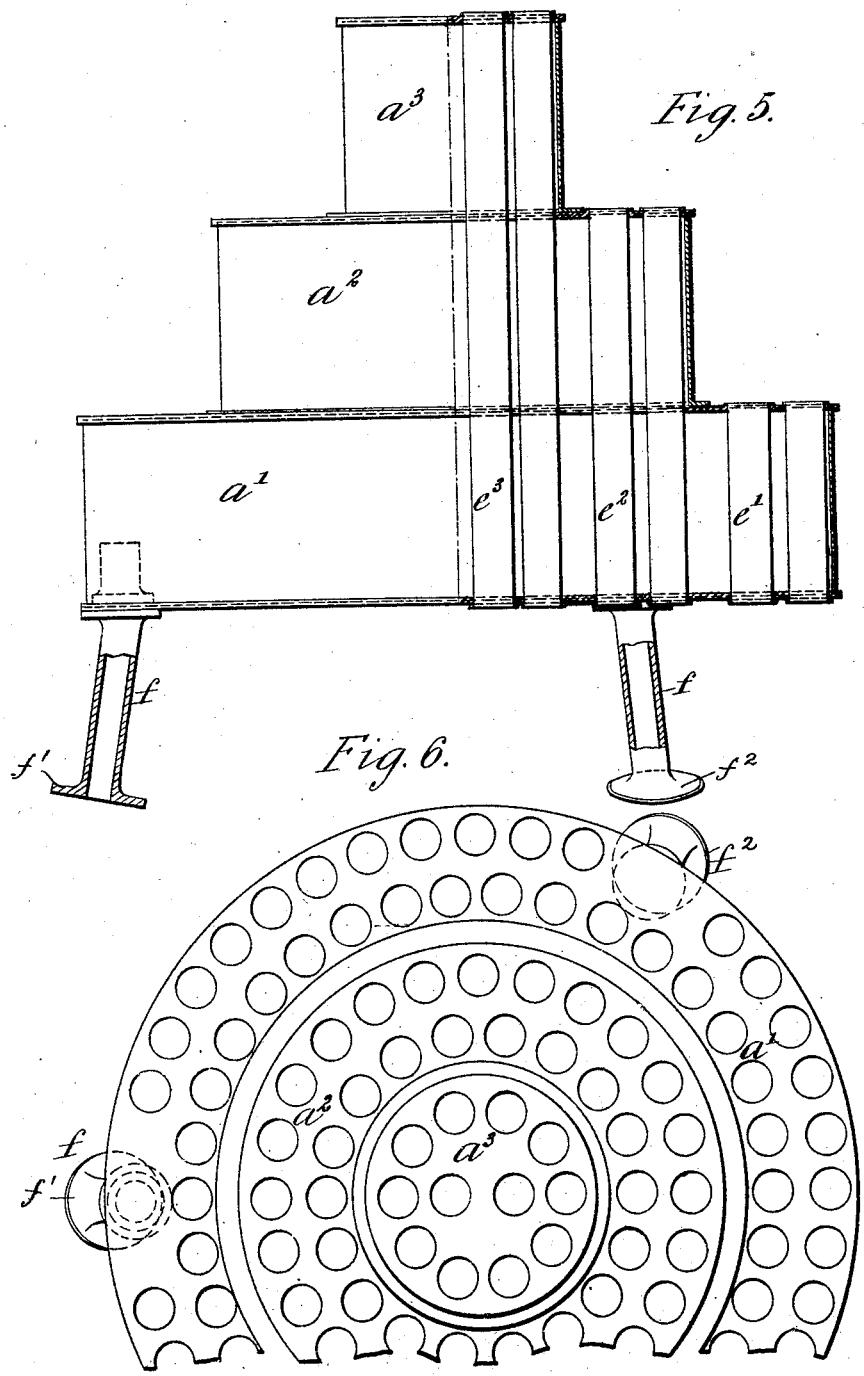

No. 857,779. PATENTED JUNE 25, 1907.
H. J. WORSSAM.
APPARATUS FOR HEATING OR BOILING BREWERS' WORT OR THE LIKE.
APPLICATION FILED MAY 29, 1905.
4 SHEETS—SHEET 4.
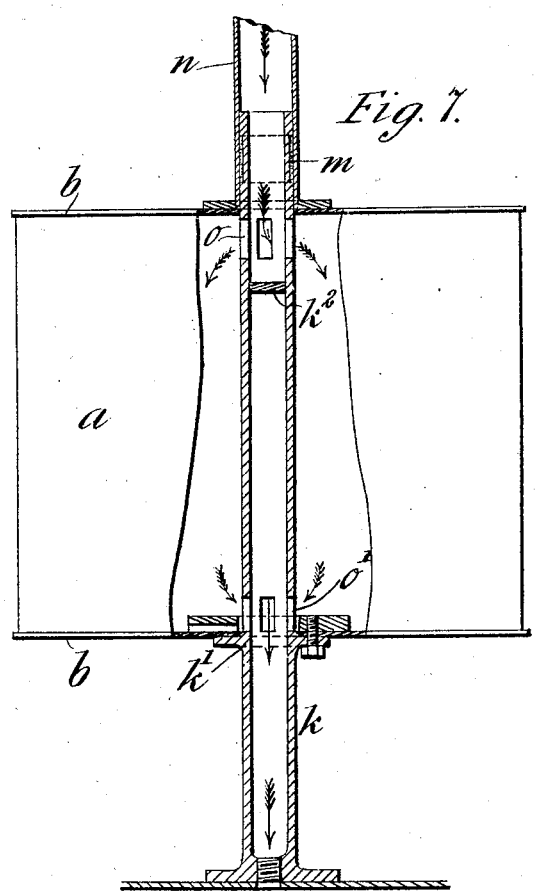

UNITED STATES PATENT OFFICE.

HENRY JOHN WORSSAM, OF LONDON, ENGLAND, ASSIGNOR TO HENRY JOHN WORSSAM, HENRY HUNT, AND HENRY SHOOLBRED FOX, TRADING AS G. J. WORSSAM & SON, OF WENLOCK ROAD, CITY ROAD, LONDON COUNTY, ENGLAND.

APPARATUS FOR HEATING OR BOILING BREWERS' WORT OR THE LIKE.

No. 857,779.      Specification of Letters Patent.      Patented June 25, 1907.

Application filed May 29, 1905. Serial No. 262,917.

*To all whom it may concern:*

Be it known that I, HENRY JOHN WORSSAM, a subject of the King of Great Britain, residing at Wenlock Road, City Road, in the county of London, England, consulting and mechanical engineer, have invented certain new and useful Improvements in Apparatus for Heating or Boiling Brewers' Wort or the Like, of which the following is a specification.

This invention relates to apparatus for heating or boiling brewers' wort or other liquids in which the liquid circulates through vertical tubes passing through a steam drum suitably supported within the containing vessel.

The present invention consists in an improved construction of such apparatus having for its objects to prevent as far as possible the lodgment of any solid matter on the outer or liquid surfaces of the heating vessel, to facilitate the distribution of the steam and the collection and removal of the water of condensation in the steam drum, and to provide a heating vessel which can be used efficiently with various depths of liquids in the containing vessel.

The invention further consists in various improvements hereinafter more specifically described with reference to the accompanying drawings, in which Figure 1 is a sectional elevation of one form of the improved apparatus; Fig. 1ª is a part vertical section showing the improved construction of the steam drum; Fig. 2 is an elevation of a heating drum with one arrangement of steam and condensation water connections, and Fig. 3 is a plan view of the drum; Figs. 4 and 4ª are detail views of the condensed water dip pipe; Figs. 5 and 6 are respectively an elevation and a plan of a multiple drum heater for dealing with various depths of liquid in the containing vessel, a modified arrangement of steam and condensed water connections being shown; and Fig. 7 is a sectional elevation of a centrally supported heating drum fitted with another arrangement of steam and condensed water connections.

Referring more particularly to Figs. 1 to 6, the heating drum is built up of a cylindrical, or other suitably shaped shell $a$ closed at each end by plates $b$ which have on their inner faces grooves $c$, Fig. 1ª preferably undercut as shown, conforming in outline with the ends of the shell which are let into the grooves and are secured therein by running soft metal $d$ into the inter-spaces, which are filled therewith to overflowing, the excess metal in the outer angle between the shell and end plate being carefully filleted as shown. By this construction an efficient steam tight joint is obtained without the use of rivets whereby an unbroken and smooth surface is obtained at the junction of the parts, affording no lodging for the retention of solid matter. For the same reason the ends $b'$ of the tubes $e$ through which the wort or other liquid circulates and which are expanded into the end plates $b$ of the drum are bent over outwardly against the surface of the end plates.

The drum is suitably supported as by feet $f$ so as to allow free circulation of the liquid in the containing vessel through the tubes $e$, and steam is admitted to the space inside the drum surrounding the tubes through an inlet pipe $g$ which may be secured by its flange to the upper end plate of the steam drum as shown in Fig. 2, or which may be itself constituted as shown in Fig. 5, by one of the feet $f'$ which in this case is made hollow and is suitably flanged for connection with the under end plate of the drum and the steam supply pipe. The steam inlet pipe is also in this case extended upwardly some distance within the drum as shown, to avoid the return therethrough of water of condensation.

The water of condensation inside the drum collects in a chamber or pocket $h$ (Figs. 1, 2 and 4) which is secured to the lower end plate $b$, and from which a dip pipe $i$ attached by its flange $i'$ to the upper end plate leads to a suitable steam trap. The lower end of the dip pipe is preferably centralized in the pocket $h$ by means of radially projecting pins or studs $h'$ extending inwardly from the walls of the pocket, and is perforated or notched as shown at $i^2$ to allow free access of the condensed water to the pipe $i$. The water is discharged through the dip pipe $i$ because the interior of the drum is under the pressure of the steam supply.

The condensed water may also be drawn off through one of the supporting feet *f*, as shown in Fig. 5, which for this purpose is made hollow and secured by a flange in connection with a suitable flush opening in the lower end plate.

When the steam drum is supported, as shown in Fig. 7, on a central support *k*, the latter may be utilized both for steam admission and removal of the condensed water. This is done by extending the hollow supporting member or pipe *k*, which is fixed by its flange *k'* to the lower end plate *b*, upwardly through the steam drum, and into the steam supply pipe *n* which is secured to the upper end plate by its flange, a steam tight expansion joint being maintained by means of packing *m* in an annular groove around the pipe *k*.

The pipe *k* is provided with a transverse partition $k^2$ in the upper part of the pipe within the drum, and between this partition and the upper end plate are openings *o* in the walls of the pipe through which the steam passes outwardly to the interior of the drum. There are similar openings *o'* in the walls of the lower part of the pipe at or about the level of the lower end plate of the drum, through which the condensed water passes inwardly from the drum to the hollow supporting member from which it is led to the steam trap.

In the modified construction of Figs. 5 and 6 a multiple heating drum is used in which three or more drums $a'\ a^2\ a^3$ are superposed axially, the lowest drum $a'$ being of greater and the top drum $a^3$ of less diameter than the intermediate drum $a^2$. There are three series of tubes, of which the series $e'$ pass through the drum $a'$ only, the series $e^2$ pass through the drums $a'\ a^2$ and the series $e^3$ pass through all three drums.

Steam is admitted to the drums, as for example, through one of the hollow supporting feet *f'*, which are shown as adapted to rest on a sloping floor and is allowed to circulate through the whole series, the water of condensation being trapped or removed as above described. By this construction circulation of the wort or other liquid is obtained as soon as the level of the liquid is higher than the upper surface of the drum $a'$, whereas in a single drum of equal height to the multiple drum there would be little circulation of the liquid until the liquid covered the upper ends of the tubes.

The containing vessel in which the steam drum is supported may be an ordinary tank of any suitable character, such tank being illustrated in Fig. 1.

Having thus described the nature of my said invention and the best means I know of carrying the same into practical effect, I claim:—

1. An apparatus for heating brewers wort or the like, adapted to be placed in a vessel containing the wort and to be surrounded thereby, consisting of a heating drum provided with supporting legs, a series of vertical tubes extending between the upper and lower ends of the drum open to the circulation of the liquid on which the drum is immersed, means for admitting steam within the drum around the tubes, and means for removing water of condensation; substantially as described.

2. In apparatus for heating liquids, a multiple steam drum arranged in tiers of diminishing diameter in an upward direction and having tubes extending through the lowest section of the drum and opening to the liquid at their upper ends at different levels, substantially as described.

In testimony whereof I have signed my name to this specification in the presence of two subscribing witnesses.

HENRY JOHN WORSSAM.

Witnesses:
JOSEPH MILLARD,
WALTER J. SKERTEN.